United States Patent [19]
Hayashi et al.

[11] Patent Number: 6,021,255
[45] Date of Patent: *Feb. 1, 2000

[54] COMPUTER SYSTEM, COMPUTER, COLOR PRINTER AND METHOD OF TRANSFERRING COLOR IMAGE DATA

[75] Inventors: Tatsuo Hayashi; Osamu Ota; Kazuya Umeyama, all of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,780

[22] Filed: Jun. 19, 1996

[30] Foreign Application Priority Data

Jun. 22, 1995 [JP] Japan ................................. 7-156431

[51] Int. Cl.$^7$ ............................................. G06F 15/00
[52] U.S. Cl. ............................................. 395/109; 395/115
[58] Field of Search ................................. 395/109, 101, 395/106, 112, 114, 115, 116; 358/517, 518, 527, 500, 519, 523, 524, 520, 521, 522; 382/167, 162, 305, 274, 283

[56] References Cited

U.S. PATENT DOCUMENTS

| | | | |
|---|---|---|---|
| 4,975,769 | 12/1990 | Aizu et al. | 358/517 |
| 5,278,640 | 1/1994 | Aizu et al. | 358/527 |

*Primary Examiner*—Dov Popovici
*Attorney, Agent, or Firm*—Jay H. Maioli

[57] ABSTRACT

A printer can be simplified in arrangement by executing a masking operation of a system including a host computer and a color printer within the host computer. In this computer system, a host computer (2) incorporates therein a masking function (5) for converting RGB data into CMY data, and transfers the CMY data to a color printer (8). The masking function (5) is provided in association with printer driver software (4) incorporated in the host computer (2).

3 Claims, 6 Drawing Sheets

COMPUTER SYSTEM, COMPUTER, COLOR PRINTER AND METHOD OF TRANSFERRING COLOR IMAGE DATA

BACKGROUND OF THE INVENTION

The present invention relates to a computer system having a host computer and a color printer connected to the host computer via an interface to output a color image, and a color image data transfer method executed by this computer system.

A color printer used in such a computer system is connected to a host computer or the like, and is used as a color printer for printing a full color image on a printing paper based on outputted color image data. Heretofore, there are known a thermal transfer printer, a dye diffusion printer (sublimation transfer) printer, etc. The sublimation transfer printer, for example, expresses a full color image at the bit unit by transferring and overlapping sublimation inks (dyes) of three colors of cyan (C), magenta (M) and yellow (Y).

Color image data handled in the inside of host computer or the like is generally digital data composed of R (red), G (green) and B (blue) color signals, and the computer outputs RGB data. Therefore, when a color image is printed out by a color printer, the color image is printed out by overlapping three dyes of C, M, Y, and hence RGB data for the computer should be converted into CMY data for the color printer.

In the present invention, conversion from RGB data composed of R, G, B color signals into CMY data composed of C, M, Y color signals will be referred to as "masking", and a circuit for effecting such masking processing will hereinafter be referred to as a "masking circuit".

Theoretically, cyan (C), magenta (M), yellow (Y) are complementary colors with respect to red (R), green (G), blue (B), respectively. Accordingly, assuming that R, G, B data of an image, for example, are 8-bit digital data, CMY color printer data may be obtained by digitally inverting these data.

If each of RGB data is expressed by 8 bits and 3 colors/1 dot are expressed by 24 bits, then RGB digital data of pure red (R) are expressed as $R=(FF)_{16}$, $G=(00)_{16}$, $B=(00)_{16}$. Then, a mixture of $(00)_{16}=C$, $(FF)_{16}=M$, $(FF)_{16}=Y$ which are CMY data obtained by digitally inverting the above RGB digital data, i.e., pure magenta and pure yellow becomes pure red. As described above, C data is determined by inverting R data; M data is determined by inverting G data; and Y data is determined by inverting B data, respectively. These methods are generally referred to as a "linear masking method".

However, in the CMY dyes (pigments) used by color printers in actual practice, dye of C contains elements of magenta and yellow in addition to an element of cyan, dye of M contains elements of cyan and yellow in addition to an element of magenta, and dye of Y contains elements of cyan and magenta in addition to an element of yellow, and therefore dyes of yellow, magenta and cyan do not correspond to pure yellow, magenta and cyan theoretically. Dyes of C, M, Y cannot independently realize ideal yellow, magenta and cyan. Accordingly, when any one of yellow, magenta and cyan is generated, all data of R, G, B are used, and CMY are properly mixed to thereby generate a target color. In other words, when each (e.g., 8 bits) of CMY data of printing dot is formed, data (e.g., 24 bits) of three colors of R, G, B are required simultaneously.

To this end, masking correction data are stored in a ROM (read-only memory), and data of one picture of each of CMY data are converted from data of three pictures of R, G, B, and determined. Further, in order to output a finished print-out of a desired color, there is used a correction method of emphasizing a particular color intentionally. This correction method is called "nonlinear masking method". To effect the above-mentioned masking, the printer needs memories for storing data of three pictures of R, G, B.

FIG. 1 of the accompanying drawings shows a conventional system in which a color printer 20 is connected to a host computer 22. Although other input and output devices, external storage devices, etc., (not shown) may be connected to the host computer 22 through a predetermined interface (not shown), those other input and output device, external storage devices, etc., are not directly concerned with the conventional system, and therefore need not be described.

As shown in FIG. 1, the host computer 22 includes an internal main memory which houses therein "printer driver software" 26 serving as software necessary for controlling a color printer such that the printer may be operated in cooperation with a predetermined printer.

The printer driver software 26 is a software whose task is to confirm the state of the color printer 20 connected to the host computer 22, to exchange output data size and to determine a transfer system or the like. As a transfer system, there is known a dot-sequential system for transferring RGB data at every dot and a line-sequential system for transferring R data, G data and B data at every picture.

As the printer driver software 26, there are roughly classified as a printer driver software incorporated together with an OS (Operating System) which is a basic software for controlling the system operation of the host computer and as a printer driver software incorporated together with individual application software running on the OS. By way of example, in the Macintosh (registered trademark) computer manufactured by Apple Computer Inc., software called "SELECTOR" corresponds to the former printer driver software, and an output program of still color picture output application software called "PHOTOSHOP" (registered trademark) corresponds to the latter printer driver software.

The color printer 20 is connected through a predetermined interface 10 to the host computer 22. As the interface 10, there are generally used SCSI (Small Computer System Interface), Centronics, or RS-232C (EIA RS-232C Standard), etc.

The color printer 20 includes an interface (I/F) unit 12 for receiving the predetermined interface 10, a memory means 28 comprising an R memory 28-1, a B memory 28-2, a B memory 28-3 each having a storage capacity of one picture for receiving each of the R, G, B data from the I/F unit 12 and storing the same, an R color adjustment circuit 30-1, a G color adjustment circuit 30-2 and a color adjustment circuit 30 comprising a B color adjustment circuit 30-3 for color adjusting R data, G data, B data outputted from these memories 28-1, 28-2, 28-3, a masking circuit 32 for receiving and converting RGB data into CMY data, a selector 34 for selecting CMY data outputted from the masking circuit 32 in response to a control signal select after the R, G, B data have been color-adjusted, a thermal head control unit 16 for effecting various kinds of correction processing such as PWM (pulse width modulation) for determining density and gradation, and a thermal head unit 18 for effecting thermal transfer without a conduction time of a heater (not shown) being varied in response to time-modulated CMY data.

The interface (I/F) 10 is an SCSI reception I/F substrate when the SCSI interface is used as an SCSI interface, and includes a line-buffer or the like.

The memory 28 incorporated in the digital color printer 20 comprises the R memory 28-1, the G memory 28-2 and the B memory 28-3, each having a memory capacity of 10 Mbytes for storing data of one picture. Therefore, the R memory 28-1, the G memory 28-2 and the B memory 28-3 include memory capacities of 30 Mbytes in total (see FIG. 2B). The reason for this will be described below. When a full color image is printed out on a printing paper of size A4 (210 mm wide and 297 mm long), if an accuracy is 300 dpi (dots per inch), then 480 dots in width×3508 dots in length=8.7 Mdots. Accordingly, image data consists of data of 8 bits (1 byte) per dot, and the printer in actual practice requires 10 Mbytes (see FIG. 2A) for each of R, G, B and requires memories of 30 Mbytes in total (see FIG. 2B).

The color adjusting circuit 30 is a circuit incorporated as a printer function, and may be a gamma correction circuit for effecting a nonlinear correction, and a correction circuit for emphasizing a particular color.

The masking circuit 32 converts the computer RGB data into the CMY data in response to dye characteristics used in the printer. Correction data is stored in the ROM or the like.

An operation of the above conventional sublimation type printer will be described below. The RGB data of one picture supplied from the host computer 22 are temporarily stored in the memory 28 with the memory sizes of three colors corresponding to the image size of the color printer 20. Upon printing, the RGB data are color-adjusted by the color adjustment circuit 30 in unison with a printing timing signal from the memory 28, and transferred to the thermal head control unit 16 through the masking circuit 32 and the selector circuit 34. The masking circuit 32 converts the RGB data into the CMY data by masking processing.

As described above, since the conventional color printer 20 temporarily stores all data of one picture and then masks the same, it should incorporate therein the memory 28 with the storage capacity corresponding to all image data. Accordingly, the conventional printer should incorporate therein a memory with an increased memory size as the size of the printing paper is increased. As a result, a cost of memory is increased, which unavoidably makes the color printer more expensive.

SUMMARY OF THE INVENTION

It is an object of the present invention to provide a video printing apparatus which can be simplified in arrangement by effecting a masking processing of a host computer and a color printer system within a host computer.

It is another object of the present invention to provide a video printing apparatus which can be simplified in arrangement by reducing memory space incorporated within a color printer connected to a host computer.

It is a further object of the present invention to provide a video printing apparatus in which a cost of an overall system can be reduced without modifying a conventional computer system greatly.

It is yet a further object of the present invention to provide a computer system in which a color printer with a simplified arrangement and a conventional color printer can be connected arbitrarily.

According to a first aspect of the present invention, there is provided a computer system in which a host computer and a color printer for printing a color image are connected through an interface. This host computer is comprised of a printer driver means for controlling the color printer, and a masking means for receiving RGB data and converting the RGB data into CMY data which are transferred to the color printer, and the color printer includes a printing means for printing a color image based on the CMY data transferred thereto.

According to a second aspect of the present invention, there is provided a computer system connected to a color printer for printing a color image through an interface. This computer is comprised of a printer driver means for controlling the color printer, and a masking means for receiving RGB data and converting the RGB data into CMY data which are transferred to the color printer.

According to a third aspect of the present invention, there is provided a color printer for printing a color image connected to a computer when in use. This color printer is comprised of a memory with a memory size corresponding to a color of one picture amount and which temporarily stores CMY data transferred from the computer, and a printing means for printing a color image based on the CMY data outputted from the memory.

According to a fourth aspect of the present invention, there is provided a method of transferring color image data by use of a computer system wherein a host computer and a color printer for printing the color image are connected through an interface. This color image data transferring method is comprised of the steps of effecting a masking processing for converting RGB data of one picture into CMY data within the host computer, temporarily storing the CMY data in a memory of the host computer, and sequentially transferring the C, M, Y data stored in the memory to the color printer at every picture amount.

In accordance with a fifth aspect of the present invention, there is provided a method of transferring color image data by use of a computer system in which a host computer and a color printer for printing a color image are connected through an interface. This color image data transferring method is comprised of the steps of (A) effecting a masking processing for converting RGB data of one picture amount into CMY data within the host computer, (B) transferring any one kind of data of the three kinds of converted CMY data to the color printer, and repeating a combination of the steps of (A) and (B) three times in response to the C, M, Y data, respectively.

In accordance with a sixth aspect of the present invention, there is provided a method of transferring color image data by use of a computer system in which a host computer and a color printer for printing a color image are connected through an interface. This color image data transferring method is comprised of the steps of detecting a memory size of the color printer based on a predetermined command from an interface used, and determining based on a detected memory size of the color printer whether the color printer has a masking function or not, wherein the host computer transfers RGB data to the color printer if it is determined that the color printer has a masking function, and the host computer converts the RGB data into CMY data and transfers the converted CMY data to the color printer if it is determined that the color printer does not have a masking function.

DESCRIPTION OF THE PREFERRED EMBODIMENT

A system of a host computer and a color printer according to the present invention will hereinafter be described with reference to the drawings.

Figure 3:
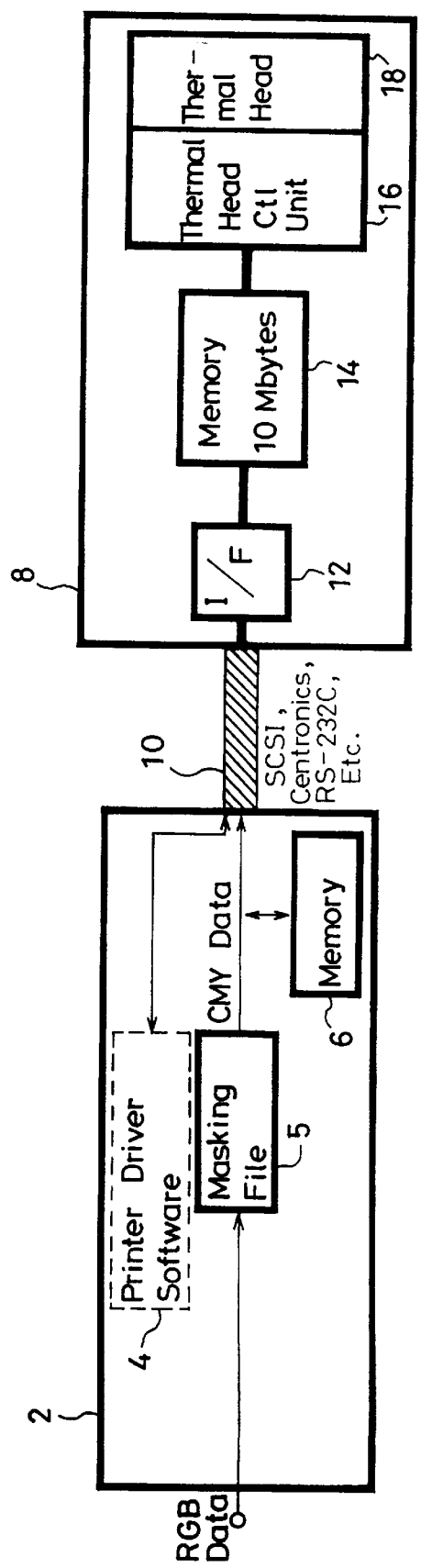
FIG. 3 is a block diagram showing an outline of a system comprising a host computer and a conventional color printer according to the present invention.

FIG. 3 is a block diagram showing a computer system comprising a host computer and a color printer according to the present invention.

In FIG. 3, a host computer 2 may be a Macintosh (registered trademark) computer manufactured by Apple Computer Inc. The computer 2 incorporates a printer driver software 4 in a hard disk such as an internal main memory, for example. In the case of a particular printing operation which will be described later on, the host computer 2 should include a memory 6 with a storage capacity of 30 Mbytes. The printer driver software 4 monitors a color printer 8 through an interface 10 to obtain information indicative of the operation condition of the color printer 28, and controls the operation of the color printer 8.

In the example of the Macintosh computer, the printer driver software "SELECTOR" prepared on the OS may be used as the printer driver software 4. Alternatively, the output program running on individual application software, e.g., "PHOTOSHOP" (registered trademark) or other printer driver software may be used as the printer driver software 4 or both of "SELECTOR" and "PHOTOSHOP" may be used as the printer driver software 4. The most specific feature of the present invention lies in that a file 5 having a masking function for converting RGB data into CMY data is added to the host computer 2 in association with the printer driver software 4.

As earlier noted, the masking file 5 is a function for converting the computer RGB data, processed within the host computer 2, into the printer CMY data in response to the color characteristics of the CMY dyes used by the printer connected. If the host computer 2 has the masking file 5 having a conversion table for executing a masking added thereto in association with the printer driver software 4, then the host computer 2 can convert the RGB data into the CMY data.

Figure 1:
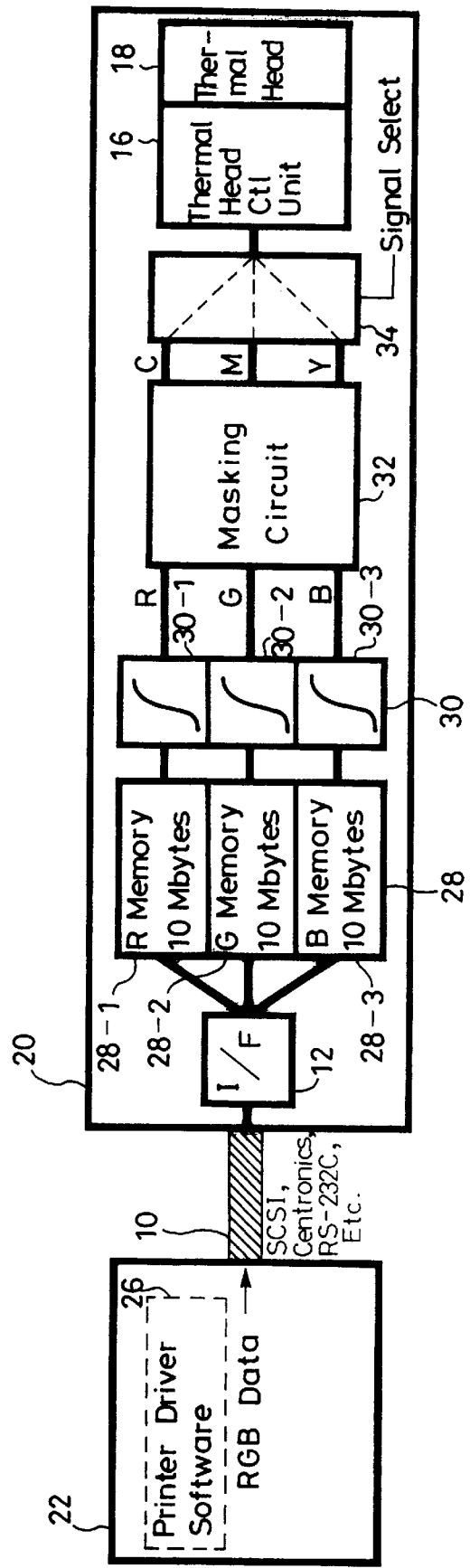
FIG. 1 is a block diagram showing an outline of a system comprising a conventional host computer and a conventional color printer.

The contents of the masking file 5 effects the same conversion action as that of the masking circuit 32 which is incorporated in the color printer 20 of the conventional computer system shown in FIG. 1 in the form of ROM. The masking file 5 may be incorporated in the printer driver software 4 or may be read out as a file different from the printer driver software 4 by the printer driver software 4 when necessary.

The color adjusting circuit (denoted by reference numeral 30 in FIG. 1) shown in the conventional system is the circuit incorporated as the function of the color printer 20, i.e., circuit for effecting gamma correction which is the nonlinear correction and emphasizing a specific color. Such correction processing also is carried out by the host computer 2 together with the processing in the masking file 5.

The memory 6 incorporated in the host computer 2 and which is required when a particular printing operation is executed requires a memory capacity of 30 Mbytes, for example. In this case, a space area of a hard disk which is a main storage device, for example, of the host computer 2 should preferably be used as the memory 6. The hard disk of the main storage device mounted on the recent host computer 2 for storing the OS and application software has a memory size of 500 Mbytes or larger, and hence such space area of the main storage device can be used as the memory 6 sufficiently. The memory 6 is not limited to the hard disk, and arbitrary storage devices, such as RAM or magneto-optical disk (MO) previously-incorporated within the system arrangement may be applied to the memory 6.

The host computer 2 is connected to the color printer 8 through the interface 10, and the interface 10 may fundamentally be the same as the conventional ones, such as SCSI, Centronics or RS-232C.

The color printer 8 includes an interface (I/F) substrate 12, a memory 14 with a storage capacity of 10 Mbytes, a thermal head control unit 16 and a thermal head 18.

The interface (I/F) unit 12 is fundamentally the same as the conventional I/F substrate 12 shown in FIG. 1, and corresponds to the interface 10 used.

Although the storage capacity of the memory 28 in the conventional color printer 20 shown in FIG. 1 is 30 Mbytes (see FIG. 2B) in total, according to the present invention, the storage capacity of the memory 14 may be 10 Mbytes (see FIG. 2C) which corresponds to one color.

Since the host computer 2 converts the RGB data into the CMY data by executing the masking processing, from a principle standpoint, the color printer 2 need not incorporate therein the memory 14, and printing data may be transferred from the host computer 2 to the printer 8 in unison with a printing period. In this case, however, 2560 data (see FIG. 2B) should be transferred during six milliseconds (ms) of the printing period. If this is realized, then the types of host computers that may be used as the host computer 2 are limited from a processing speed and transfer speed standpoint.

There is proposed a method in which the printing period is not fixed and the color printer 8 starts the printing immediately after CMY data is transferred from the host computer 2. However, in the case of a sublimation transfer printer, if the line period of printing is not constant, then accumulated heat in the thermal head becomes difficult to be correct, and a beautiful image becomes difficult to reproduce. Therefore, the above-mentioned method is not preferable. For the reason described so far, according to this embodiment, the color printer 8 incorporates therein the memory 14 with the storage capacity of 10 Mbytes corresponding to one color (see FIG. 2C).

The thermal head control unit 16 and the thermal head 18 may be fundamentally the same as the thermal head control unit 16 and the thermal head 18 of the conventional color printer 20 shown in FIG. 1.

A printing operation of the computer system shown in FIG. 3 will be described with reference to FIGS. 4 to 6. Two types of printing operations are available according to the present invention, and will hereinafter be described with reference to FIGS. 4 and 5. A printing operation executed when a plurality of color printers (denoted by reference numeral 8 in FIG. 3) according to the present invention and conventional color printers (depicted by reference numeral 20 in FIG. 1) are connected together through multiplexers (not shown) or when a color printer to be connected is exchanged from the conventional color printer 20 to the color printer 8 according to the present invention will be described with reference to FIG. 6.

Figure 4:
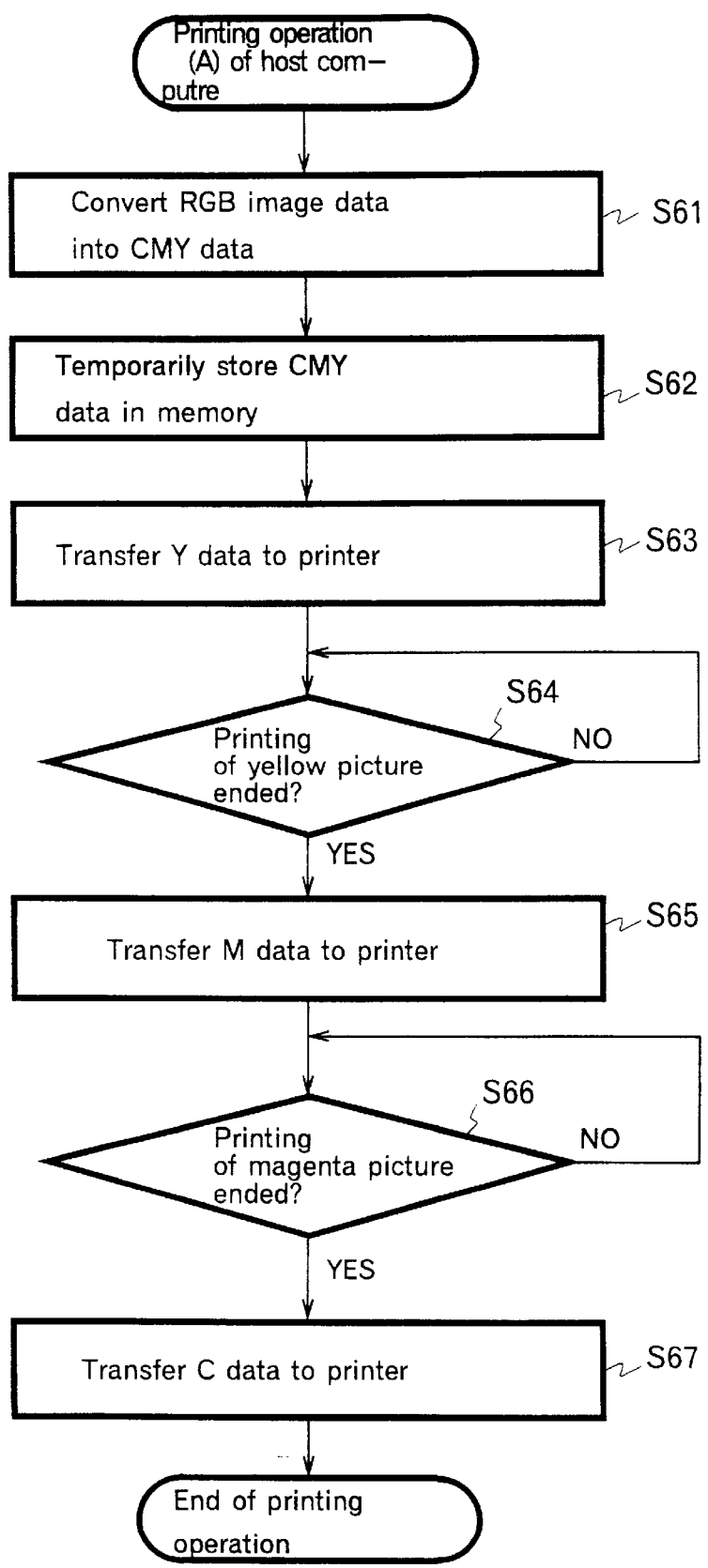
FIG. 4 is a flowchart showing a printing operation (A) of the system comprising the host computer and the color printer shown in FIG. 3.

The printing operation (A) shown in FIG. 4 is suitable for the case wherein the memory size of the main storage device of the host computer 2 is large and the memory has a large storage capacity. The printing operation (A) requires the memory 6. As shown in FIG. 4, RGB image data to be printed and which were adjusted within the host computer 2 are converted into CMY data by the masking function 5 provided in association with the printer driver software 4 at step S61. Converted CMY data is temporarily stored in the memory 6 at step S62. The memory 6 has a memory capacity of 30 Mbytes which is large enough to store image data of one picture.

Of the CMY data stored in the memory 6, Y data is transferred through the interface 10 to the color printer 8 at step S63. Until the color printer 8 finishes printing Y data of one picture, the host computer 2 continues transferring Y data. It is determined in the next decision step S64 whether or not the printing of yellow picture by the color printer 8 is ended. The printer driver software 4 monitors whether or not the printing of pictures by the color picture is ended. Then, of the CMY data stored in the memory 6, M data is transferred through the interface 10 to the color printer 8 at step S65. Until the color printer 8 finishes printing M data of one picture, the host computer 2 continues transferring M data. It is determined in the next decision step S66 whether or not the printing of magenta picture by the color printer 8 is ended. Finally, of the CMY data stored in the memory 6, C data is transferred through the interface 10 to the color printer 8. Until the color printer 8 finishes printing C data of one picture, the host computer 2 continues transferring C data, and the color printer 8 prints cyan picture at step S67, In this manner, a full-color printing of one picture is ended.

The most specific feature of the printing operation (A) shown in FIG. 4 lies in that the host computer 2 needs the memory 6 for temporarily storing CMY data so that only one masking processing is required.

Figure 5:
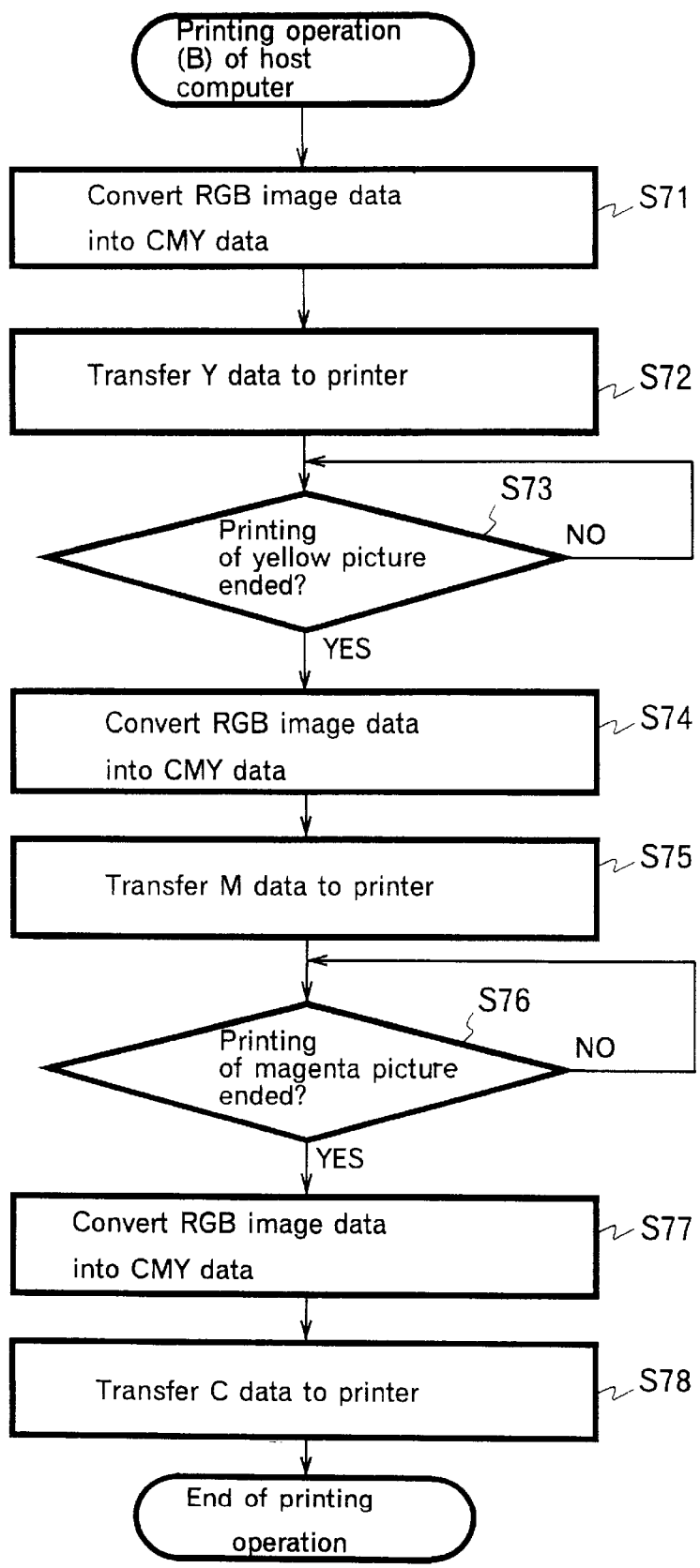
FIG. 5 is a flowchart showing other printing operation (B) of the system comprising the host computer and the color printer shown in FIG. 3.

Another printing operation (B) shown in FIG. 5 is suitable for the case wherein the memory size of the memory 6 incorporated in the host computer 2 is small and the memory has an insufficient storage capacity. The printing operation (B) does not require the memory 6. As shown in FIG. 5, RGB data to be printed and which were adjusted within the host computer 2 are converted into CMY data by the masking function 5 provided in association with the printer driver software 4. Converted CMY data are not stored in the memory 6 and, of the CMY data, Y data is transferred through the interface 10 to the memory 14 of the color printer 8 at step S72. It is determined in the next decision step S73 whether or not the printing of yellow picture by the color printer 8 is ended.

At step S74, RGB data to be printed and which were adjusted within the host computer 2 are again converted into CMY data by the masking function 5 provided in association with the printer driver software 4. Of the converted CMY data, M data is transferred through the interface 10 to the memory 14 of the color printer 8 at step S75. It is determined in the next decision step S76 whether or not the printing of magenta picture by the color printer 8 is ended.

Finally, RGB data to be printed and which were adjusted within the host computer 2 are again converted into CMY data by the masking function 5 provided in association with the printer driver software 4 at step S77. Of the converted CMY data, C data is transferred through the interface 10 to the color printer 8 at step S78. The color printer 8 continues printing the image of C data of one picture until the cyan picture is printed out. In this manner, a full-color printing of one picture is ended.

The most specific feature of the printing operation (B) shown in FIG. 5 lies in that RGB data is converted into CMY data by the masking function 5 before CMY pictures are each printed out and data a color a particular kind to be printed is transferred. Unlike the printing operation (A) shown in FIG. 4, in this case, the memory 6 for storing the CMY data is not required but the masking processing for the CMY data should be carried out three times in total.

Operations of other portions of the computer system according to the embodiment shown in FIG. 3 are similar to those of the conventional system shown in FIG. 1.

Figure 2C:
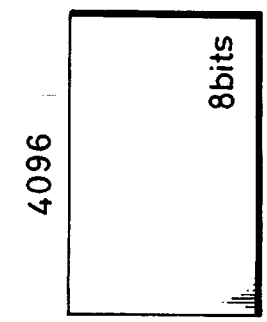
FIGS. 2A to 2C are schematic diagrams used to explain memory sizes of a conventional printer and a printer according to the present invention.
Figure 2B:
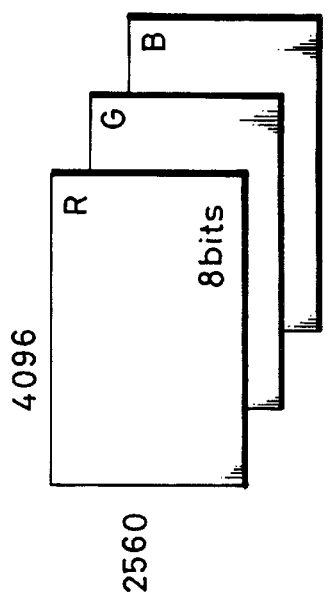
Figure 2A:
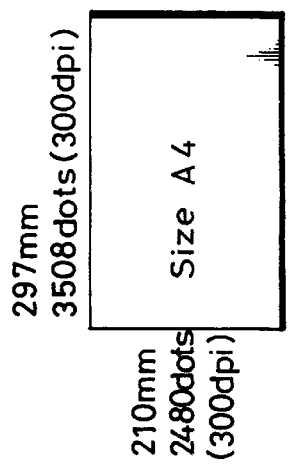

The color printer 8 made as an experiment is the digital color printer 8 with the SCSI interface 10 and includes the memory 14 with the storage capacity of 10 Mbytes (see FIG. 2C). The memory 14 can include an additional memory with storage capacity of 20 Mbytes as an option, and hence can include a memory with a storage capacity of 30 Mbytes (see FIG. 2B). When the color printer 8 includes the memory 14 with the storage capacity of 30 Mbytes for three colors, the color printer 8 is equivalent to the conventional printer shown in FIG. 1.

Figure 6:
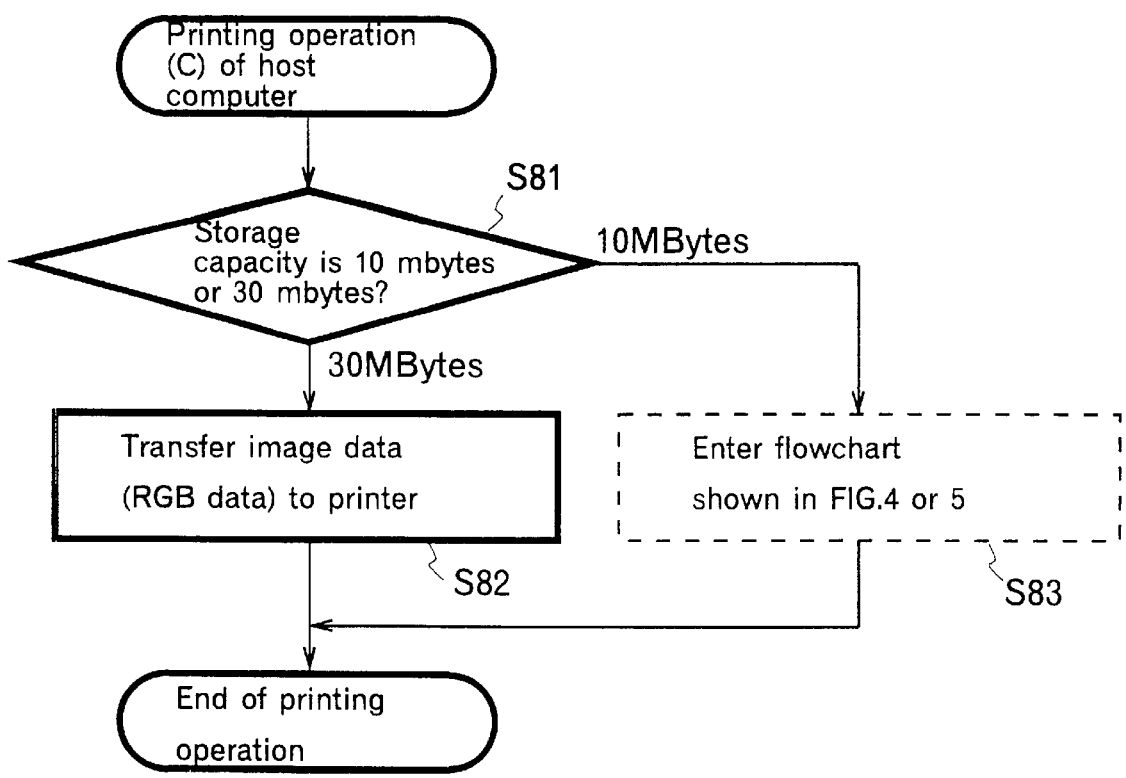
FIG. 6 is a flowchart showing a printing operation (C) executed when a printer is exchanged in the system comprising the host computer and the color printer shown in FIG. 3.

A flowchart of the printing operation (C) shown in FIG. 6 shows an operation of the host computer 2 suitable for the case wherein the color printer (denoted by reference numeral 6 in FIG. 3) according to the present invention and the conventional color printer (denoted by reference numeral 20 in FIG. 1) are connected to the host computer 2 in the mixed state or the case wherein the color printer is exchanged between the conventional color printer and the color printer according to the present invention.

When the power switch is turned on, the host computer 2 determines in decision step S81 on the basis of the operation of the printer driver software 4 of the host computer 2 through the SCSI command whether the storage capacity of the memory 14 of the color printer 8 is 10 Mbytes or 30 Mbytes. If the storage capacity of the memory 14 is 30 Mbytes (i.e., if the color printer is the conventional color printer), the host computer 2 transfers RGB data to the color printer 8 as they are at step S82. If the storage capacity of the memory 14 is 10 Mbytes (i.e., if the color printer is the color printer according to the present invention), then the host computer 3 transfers the converted CMY data to the color printer 8 as they are at step S83.

Effects achieved by the present invention will be described below. Since the masking work for converting image data from RGB data into CMY data is executed not in the inside of the color printer 8 but on the side of the host computer 2, in the case of size A4 paper, the memory capacity of the memory incorporated within the color printer 8 can be reduced from 30 Mbytes (see FIG. 2B)of a conventional memory to 10 Mbytes (see FIG. 2C) according to the present invention. Therefore, since the storage capacity of the memory 14 incorporated in the color printer 8 is reduced, the color printer can be made inexpensive.

Since the host computer 2 includes the masking data 5, the memory with the large storage capacity within the host computer 2 can be utilized. Furthermore, there is then the advantage that the present invention can flexibly cope with the change of the masking processing by varying the masking files stored in the memory incorporated within the host computer 2. According to the present invention, the present invention can be carried out by changing only a software without substantially modifying the hardware of the conventional host computer 2.

Although new printers should be manufactured inherently, if a memory of a conventional color printer is removed and an external interconnection is slightly changed as an experiment in order to confirm the effects achieved by the present invention, then the present invention can be carried out.

According to the present invention, since the masking operation of the host computer and the color printer is executed within the host computer, the printer can be simplified in arrangement.

According to the present invention, memory space incorporated within the color printer connected to the host computer is reduced, and hence the color printer can be simplified in arrangement.

Further, according to the present invention, the cost of overall system can be reduced without greatly changing a conventional computer system.

Furthermore, according to the present invention, it is possible to provide a computer system wherein a simplified printer and a conventional printer can be connected arbitrarily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of transferring color image data by use of a computer system in which a host computer and a color printer for printing a color image are connected through an interface, the method comprising the steps of:

detecting a memory size of said color printer based on a predetermined command from the interface; and determining based on said detected memory size of said color printer whether said color printer has a masking function, wherein if it is determined that said color printer has a masking function said host computer transfers RGB data to said color printer and if it is determined that said color printer does not have a masking function said host computer converts said RGB data into CMY data and transfers said converted CMY data one color at a time to said color printer.

2. The method of transferring color image data by use of a computer system as claimed in claim 1, wherein after determining that said color printer does not have a masking function, performing the further steps of:

effecting a masking processing for converting RGB data of one picture into CMY data within said host computer;

temporarily storing said CMY data in a memory of said host computer; and sequentially transferring said CMY data stored in said memory to said color printer at every picture amount.

3. The method of transferring color image data by use of a computer system as claim in claim 1, wherein after determining that said color printer does not have a masking function, performing the further steps of:

effecting a masking processing for converting RGB data of one picture amount into CMY data within said host computer;

transferring any one kind of data of the three kinds of converted CMY data to said color printer; and repeating a combination of said steps of effecting and converting three times in response to each kind of CMY data, respectively.

* * * * *